(No Model.)
R. JOHNSON.
SEED PLANTER.
No. 364,824. Patented June 14, 1887.
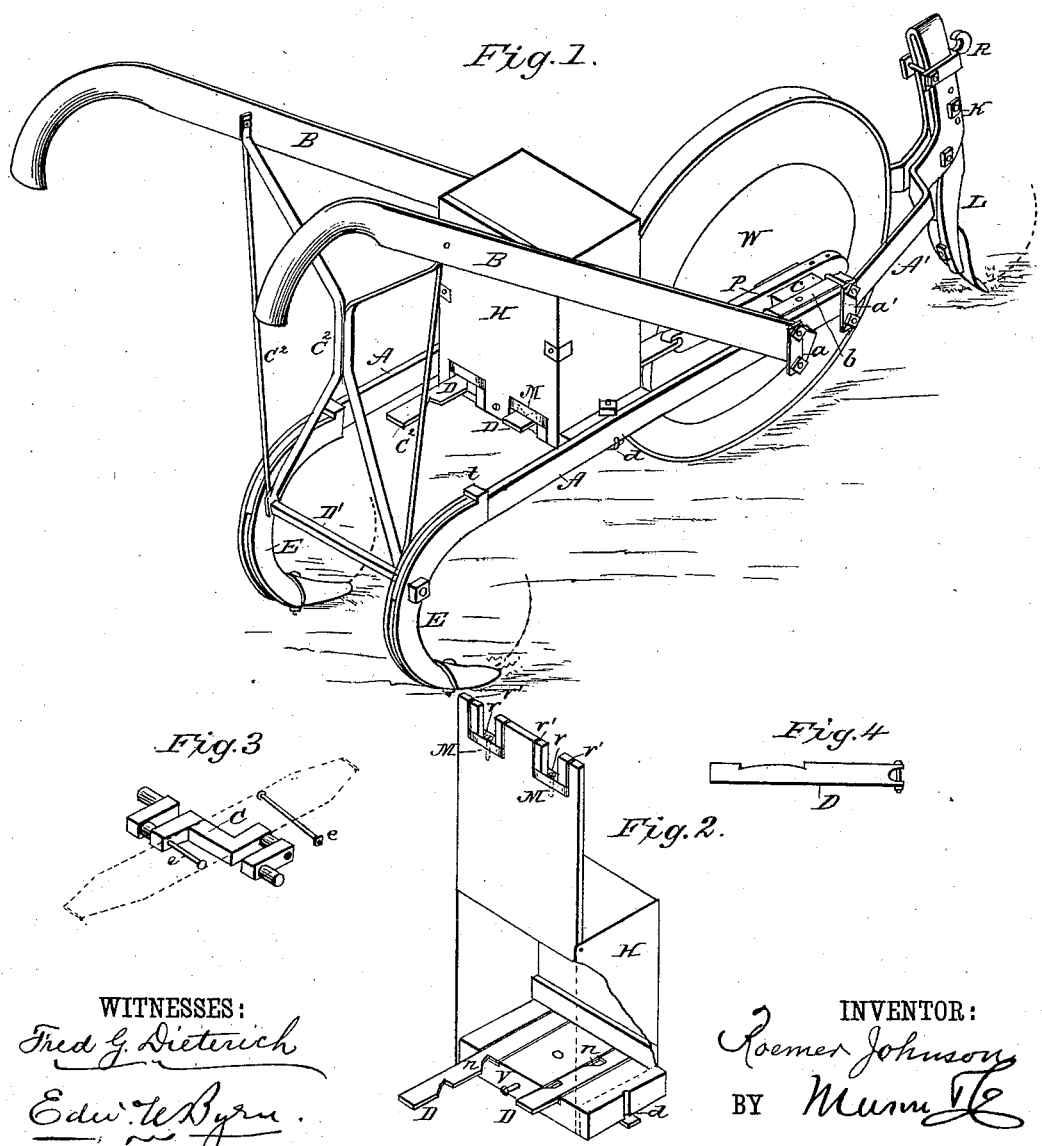
WITNESSES:
Fred G. Dieterich
Edw. W. Byrn
INVENTOR:
Roemer Johnson
BY Munn
ATTORNEYS.

UNITED STATES PATENT OFFICE.

ROEMER JOHNSON, OF TACALEECHE, MISSISSIPPI.

SEED-PLANTER.

SPECIFICATION forming part of Letters Patent No. 364,824, dated June 14, 1887.

Application filed January 22, 1887. Serial No. 225,100. (No model.)

*To all whom it may concern:*

Be it known that I, ROEMER JOHNSON, of Tacaleeche, in the county of Benton and State of Mississippi, have invented a new and useful Improvement in Seed-Planters, of which the following is a specification.

My invention relates to that class of seed-planters in which a wheel running upon the ground imparts through pitmen a reciprocating motion to feed-slides in the seed-box; and it consists in a peculiar construction and arrangement of parts, whereby a very simple, practical, and efficient planter is provided, adapted to plant all kinds of grain and seeds.

Figure 1 is a perspective view of the planter. Fig. 2 is a perspective view of the seed-box with the hinged door open and the side partly broken away. Fig. 3 is a detail in perspective of the crank-shaft, and Fig. 4 is a detail of a modified form of slide for the seed-box.

In the drawings, A A represent the two side bars made of iron and connected in the rear by a cross-bar, D'.

B B are the handles, which at their front ends are connected to the side bars by clips $a$, and are supported at their rear ends by braces $C^2$, connecting with the cross-bar D' below.

W is the front wheel, which is made of wood, about twenty inches in diameter and three inches thick in the middle. This wheel has rigidly attached to it a double-crank shaft, C, Fig. 3, made in one piece by forging or casting, and having a hole through its crank-pins, through which long bolts $e\ e$ are passed to connect it rigidly to the wheel. The outer ends of this crank-shaft turn in bearing-blocks $b$, which are fastened to the side bars, A, by means of clips $a$ and $a'$, one of which also secures the front ends of the handles.

To the cranks are attached the pitmen P, which extend back to and are connected with the feed-slides D. These slides are made of steel and reciprocate in iron-lined channels in the bottom of the feed-box H, and instead of having holes cut through them they have one or more notches of nearly triangular shape (see Fig. 2) cut in their edges. As the wheel W revolves, these feed-slides are alternately drawn into the seed-box and the notches filled, and are then pushed out to the rear to drop the contents of the notches. Now, if the wheel W be sixty inches in circumference and the two feed-slides have a single notch in each, the seed is dropped in hills thirty inches apart. By using feed-slides with two notches, as shown, the hills are placed fifteen inches apart. By using three notches, the hills are dropped seven and one-half inches apart, and by altering the diameter of the wheel W these distances may be varied. Small grains like wheat or rice may be drilled by cutting a series of small notches or making an offset in the side of the feed-slides equal to the length of the stroke, as in Fig. 4.

In dropping the seed from the planter, the slides are kept from crushing the grain by means of an elastic edge on the feed-box where the slides protrude. This elastic edge is applied in a peculiar way, as shown in Fig. 2. Notches $r$ are first cut in the side of the box, then saw-kerfs $r'\ r'$ are sawed parallel with the sides of these notches, and rubber bands M are then slipped into these saw-kerfs till the band reaches the bottom of the notch, where it forms an elastic surface that scrapes the top of the feed-slides. The side of the seed-box in which these notches are formed is hinged at the top by two screws, so that it may be turned up to expose the interior of the box, as shown in Fig. 2.

The wear of the feed-slides is taken up by set-screws. Said feed-slides are drawn in the box by the crank-shaft, and when the crank is at the end of its stroke one slide is receiving the seed while the other is dropping. At this time the slide within the box is temporarily at rest while the crank is passing the dead-center, so that the seed has ample time to fall into the notches of the seed-slide. The center of the crank-shaft is a little lower than the slides, which makes this rest or stop a little longer, which gives a great advantage over droppers which do not act in this way.

To the rear end of the side bars, A, and upon cross-bar D' as an axis, are hinged the rear plows, E, which are capable of being turned up, as shown by the dotted lines, to permit the planter to be transported from field to field upon its front wheel, like a wheelbarrow. The shanks of these plows are made double and embrace the rear ends of the side bars, A; and a cross-piece, $t$, at the front end of said shank operates as a stop on the side bar to limit the backward motion of the plow and resist the draft-strain. The seed-box H is held in place in the side bars by a hooked bolt, $d$, on each side, and in front of the wheel H the side bars are made to converge, and are then bent up like a prow to form a socket to receive the shank of the front plow, L, which is hinged upon the bolt K, and is also capable of being turned up, as shown by the dotted lines. A vertically-adjustable draft-clevis, R, connects with the top of this prow, and acts also as a stop for the top part of the shank of the front plow, L.

This machine is very simple and durable and needs but few repairs, and only such as can be made by any farmer, carpenter, or blacksmith.

If desired, a partition may be placed in the seed-box, and two kinds of seed—such as corn and peas—may be planted in alternate hills.

Having thus described my invention, what I claim as new is—

1. The combination, with the wheel W, of the double-crank shaft C and the bolts $e$ $e$, passing through holes in the crank-pins and through the wheel for rigidly connecting the two together, substantially as described.

2. The combination, with the feed-slides and a seed-box having slits or saw-kerfs $r'$ cut therein, of the rubber bands M, secured in said saw-kerfs, as and for the purpose described.

3. The combination of wheel W, having rigid double-crank shaft C, the journal-boxes $b$, side bars, A, and the clips $a$ $a'$, securing the journal-boxes, handles, and side bars together, substantially as shown and described.

4. The combination, with the side bars, A A, having cross-bar D' at their rear ends, of the double-shanked plows E, hinged upon the cross-bar D', and having stops $t$ at their forward ends, the braces C², connecting with the cross-bar, and the handles sustained upon said braces, substantially as shown and described.

5. The side bars, A A, converging at their front ends and bent up to form a socket, in combination with a plow having its shank secured in said socket by bolt K, and a draft-clevis, R, acting as a stop to the upper end of the shank, substantially as and for the purpose described.

ROEMER JOHNSON.

Witnesses:
JULIUS BEONHEIM,
C. W. STEUART.